(12) United States Patent
Moreton et al.

(10) Patent No.: US 11,704,661 B2
(45) Date of Patent: Jul. 18, 2023

(54) SYSTEMS AND METHODS FOR GENERATING AND MANAGING DYNAMIC CUSTOMIZED ELECTRONIC TOKENS FOR ELECTRONIC DEVICE INTERACTION

(71) Applicant: Capital One Services, LLC, McLean, VA (US)

(72) Inventors: Paul Y. Moreton, McLean, VA (US); Matthew De Ganon, McLean, VA (US); Thomas S. Poole, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 31 days.

(21) Appl. No.: 17/242,764

(22) Filed: Apr. 28, 2021

(65) Prior Publication Data

US 2021/0248593 A1 Aug. 12, 2021

Related U.S. Application Data

(63) Continuation of application No. 16/675,211, filed on Nov. 5, 2019, now Pat. No. 11,023,887, which is a
(Continued)

(51) Int. Cl.
| | |
|---|---|
| *G06Q 20/36* | (2012.01) |
| *G06Q 20/38* | (2012.01) |
| *G06Q 20/40* | (2012.01) |
| *G06Q 20/06* | (2012.01) |
| *G06Q 20/32* | (2012.01) |

(Continued)

(52) U.S. Cl.
CPC ......... *G06Q 20/3672* (2013.01); *G06F 21/44* (2013.01); *G06F 21/6209* (2013.01); *G06F 21/6272* (2013.01); *G06F 21/73* (2013.01); *G06Q 20/0652* (2013.01); *G06Q 20/327* (2013.01); *G06Q 20/385* (2013.01); *G06Q 20/3829* (2013.01); *G06Q 20/40* (2013.01)

(58) Field of Classification Search
CPC .......... G06Q 20/3672; G06Q 20/0652; G06Q 20/327; G06Q 20/3829; G06Q 20/385; G06Q 20/40; G06F 21/44; G06F 21/6209; G06F 21/6272; G06F 21/73
USPC ......................................... 726/20
See application file for complete search history.

(56) References Cited

U.S. PATENT DOCUMENTS

| | | | | |
|---|---|---|---|---|
| 2008/0065555 | A1* | 3/2008 | Mullen | G06Q 20/3674 705/41 |
| 2013/0132283 | A1* | 5/2013 | Hayhow | G06Q 20/1085 705/67 |
| 2014/0074637 | A1* | 3/2014 | Hammad | G06Q 20/351 705/41 |

* cited by examiner

*Primary Examiner* — Jacob Lipman
(74) *Attorney, Agent, or Firm* — Perkins Coie LLP

(57) ABSTRACT

Systems and methods are provided for generating and managing dynamic customized electronic tokens for electronic device interactions. A system for transferring data between a user device associated with a user and a remote device may include a memory storing instructions and a processor configured to execute the stored instructions. The stored instructions may configure the processor to receive, via a network, transaction information from the remote device, access information associated with an electronic token, and provide the electronic token to the remote device. The electronic token may be associated with at least one of the user or the user device, and a token server may generate the electronic token based on the received transaction information, and determine one or more expiration parameters for the electronic token.

20 Claims, 8 Drawing Sheets

Related U.S. Application Data continuation of application No. 16/151,240, filed on Oct. 3, 2018, now Pat. No. 10,482,456, which is a continuation of application No. 15/700,074, filed on Sep. 8, 2017, now Pat. No. 10,115,104.

(60) Provisional application No. 62/394,145, filed on Sep. 13, 2016.

(51) Int. Cl.
*G06F 21/44* (2013.01)
*G06F 21/62* (2013.01)
*G06F 21/73* (2013.01)

SYSTEMS AND METHODS FOR GENERATING AND MANAGING DYNAMIC CUSTOMIZED ELECTRONIC TOKENS FOR ELECTRONIC DEVICE INTERACTION

CROSS REFERENCE TO RELATED APPLICATION

This application is a continuation of U.S. patent application Ser. No. 16/675,211 filed on Nov. 5, 2019, which is a continuation of U.S. patent application Ser. No. 16/151,240 filed on Oct. 3, 2018, which is a continuation of U.S. patent application Ser. No. 15/700,074 filed on Sep. 8, 2017, which claims the benefit of priority under 35 U.S.C. § 119(e) to U.S. Provisional Application No. 62/394,145, filed on Sep. 13, 2016, the content of which applications is hereby incorporated by reference in its entirety.

TECHNICAL FIELD

The disclosed embodiments generally relate to electronic tokens and token-based transactions.

BACKGROUND

Advancements in computer technologies including the Internet, wireless data transmission, and distributed networked computing have brought about new mechanisms for electronic devices to communicate and exchange information, including the use of tokenized information. Tokens can include files or information generated on-demand or for a limited period of time, to replace sensitive information normally transmitted in traditional computer systems. For example, a mobile device may generate an alphanumeric token to replace an account number, name, or any other sensitive information, and the token may be provided to another electronic device in order to establish a connection with the other device, convey sensitive information in a cryptic manner, or initiate or complete a transaction involving the token receiving device.

An example of the benefits of token-based transactions relates to online purchase transactions. In traditional systems, a computer transmits account information such as a credit card number to a merchant. The merchant then authorizes the credit card once to complete the transaction, but then may authorize the account number multiple additional times. For example, backordered items or split shipments may require multiple authorizations at multiple different times after the initial purchase transaction is completed, because merchants generally collect payment when items are shipped, and not when the order is received. Thus, the merchant's computer system retains the sensitive account information and uses the information as needed to charge the purchaser when items are shipped or become available. Traditional systems are extremely vulnerable, however, because the sensitive account information is stored at the merchant system and subject to compromise including fraud, hacking, and identity theft.

Advances in computer technology and widespread Internet connectivity have given rise to new systems which address the security concerns of traditional systems and complete purchase transactions in a more secure manner. Modern systems use electronic "tokens" in place of sensitive account information. Unlike an account number, a token is a set of information, such as an alphanumeric string, that points to an account. Using a token, the merchant and intermediary processing entities do not obtain any sensitive information, yet the merchant and processing servers can complete the transaction and associate the transaction with the correct account. After the transaction completes, the token may expire or otherwise deactivate. As another example, a server may generate a token for allowing access for a user to a secure area for a predetermined amount of time, so that the user can unlock electronic doors with a card, fob, or mobile device without sending sensitive identification data.

Tokens are often generated for transmission from particular devices, for use with particular merchants, or with far shorter lifespans than sensitive account numbers. Therefore, a compromised token does not automatically give unauthorized individuals access to an account. Token systems are necessarily rooted in Internet computer technologies, because they are often generated dynamically or frequently, and often include additional verification requirements identifying the device that presented the token in a transaction, or expected parties in transactions. Thus, token systems have greatly increased the security of Internet-based purchase transactions.

Token systems are not without faults and drawbacks, and with the proliferation of ecommerce and merchant aggregators such as eBay and Amazon, problems have arisen in token systems that result in decreased network performance as well as diminished backend computer system performance. For example, tokens often expire after a predetermined time period or amount of usage. Tokens that expire prematurely often result in failed or declined transactions, prompting new transactions, additional token requests, and additional tokens. In modern bidirectional communication systems, the additional network and processing load compounds quickly due to the number of users, and backend system performance suffers from unnecessary transaction declines and redundant token generation.

In view of the shortcomings of current systems, improved systems and methods for electronic token generation and tokenized device interaction are desired, to improve backend computer system performance and reliability, as well as enhance performance in Internet-based transactions.

SUMMARY

Disclosed embodiments provide systems and methods for generating and managing dynamic customized electronic tokens for electronic device interaction.

Consistent with a disclosed embodiment, a token-based electronic device interaction system for transferring data between a user device associated with a user and a remote device is provided. The system may include a memory storing instructions and a processor configured to execute the stored instructions. The stored instructions may configure the processor to receive, via a network, transaction information from the remote device, access information associated with an electronic token, the electronic token being associated with at least one of the user or the user device, generated based on the received transaction information, and associated with one or more expiration parameters, and provide the information associated with the electronic token to the remote device.

Consistent with another embodiment, a token-based electronic device interaction system for transferring data between a user device associated with a user and a remote device is provided. The system may comprise, a memory storing instructions, and a processor. The processor may be configured to execute the stored instructions to receive, via a network, first transaction information for a transaction, access user data comprising at least one of user information or user device information, generate, based on the first transaction information and the user data, an electronic token associated with an expiration parameter, provide the electronic token to the user device, monitor a status of the transaction, determine whether the expiration parameter is exceeded, based on the monitored status, and deactivate the electronic token if the expiration parameter is exceeded.

Consistent with another embodiment a token-based electronic device interaction method is provided. The method may include receiving, via a network, first transaction information from the remote device, accessing information associated with an electronic token, the electronic token being associated with at least one of the user or the user device, generated based on the received first transaction information, and associated with an expiration parameter, and providing the information associated with the electronic token to the remote device.

Consistent with another embodiment, a token-based electronic device interaction method is provided. The method may comprise receiving, via a network, transaction information for a transaction, accessing user data comprising at least one of user information or user device information, generating, based on the transaction information and the user data, an electronic token, wherein the electronic token is associated with an expiration parameter, providing the electronic token to the user device, monitoring a status of the transaction, determining whether the expiration parameter is exceeded based on the monitored status, and deactivating the electronic token if the expiration parameter is exceeded.

Consistent with another disclosed embodiment, a token-based electronic device interaction system for transferring data between a user device associated with a user and a remote device is provided. The system may include a memory storing instructions and a processor configured to executed the stored instructions. The stored instructions may configure the processor to access information associated with an electronic token, the electronic token being associated with at least one of the user or the user device, generated based on the received transaction information, and associated with one or more first expiration parameters, determine whether at least one of the one or more first expiration parameters has been met responsive to a determination that at least one of the one or more first expiration parameters has not been met, access one or more second expiration parameters, store the one or more second expiration parameters, thereby erasing the one or more first expiration parameters, and provide the information associated with the electronic token to the remote device.

Consistent with another embodiment, a token-based electronic device interaction system for transferring data between a user device associated with a user and a remote device is provided. The system may comprise, a memory storing instructions, and a processor. The processor may be configured to executed the stored instructions to access user data comprising at least one of user information or user device information, generate, based on the first transaction information and the user data, an electronic token associated with a first expiration parameter, provide the electronic token to the user device, monitor a status of the transaction, determine whether the first expiration parameter is exceeded, based on the monitored status, receive a second expiration parameter, store the second expiration parameter if the first expiration parameter is not exceeded, thereby erasing the first expiration parameter, and deactivate the electronic token if the first expiration parameter is exceeded.

Consistent with another embodiment a token-based electronic device interaction method is provided. The method may include receiving, via a network, first transaction information from the remote device, accessing information associated with an electronic token, the electronic token being associated with at least one of the user or the user device, generated based on the received first transaction information, and associated with an expiration parameter, determining whether at least one of the one or more first expiration parameters has been met, responsive to a determination that at least one of the one or more first expiration parameters has not been met, accessing one or more second expiration parameters, storing the one or more second expiration parameters, thereby erasing the one or more first expiration parameters, and providing the information associated with the electronic token to the remote device.

Consistent with another embodiment, a token-based electronic device interaction method is provided. The method may comprise accessing user data comprising at least one of user information or user device information, generating, based on the transaction information and the user data, an electronic token, wherein the electronic token is associated with a first expiration parameter, providing the electronic token to the user device, monitoring a status of the transaction, determining whether the first expiration parameter is exceeded based on the monitored status, receiving a second expiration parameter, storing the second expiration parameter if the first expiration parameter is not exceeded, thereby erasing the first expiration parameter, and deactivating the electronic token if the first expiration parameter is exceeded.

Consistent with other disclosed embodiments, non-transitory computer-readable storage media may store program instructions, which are executed by at least one processor device and cause the at least one processor to perform operations consistent with any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute apart of this specification, illustrate several embodiments and, together with the description, serve to explain the disclosed principles. In the drawings.

DESCRIPTION OF THE EMBODIMENTS

Figure 1:
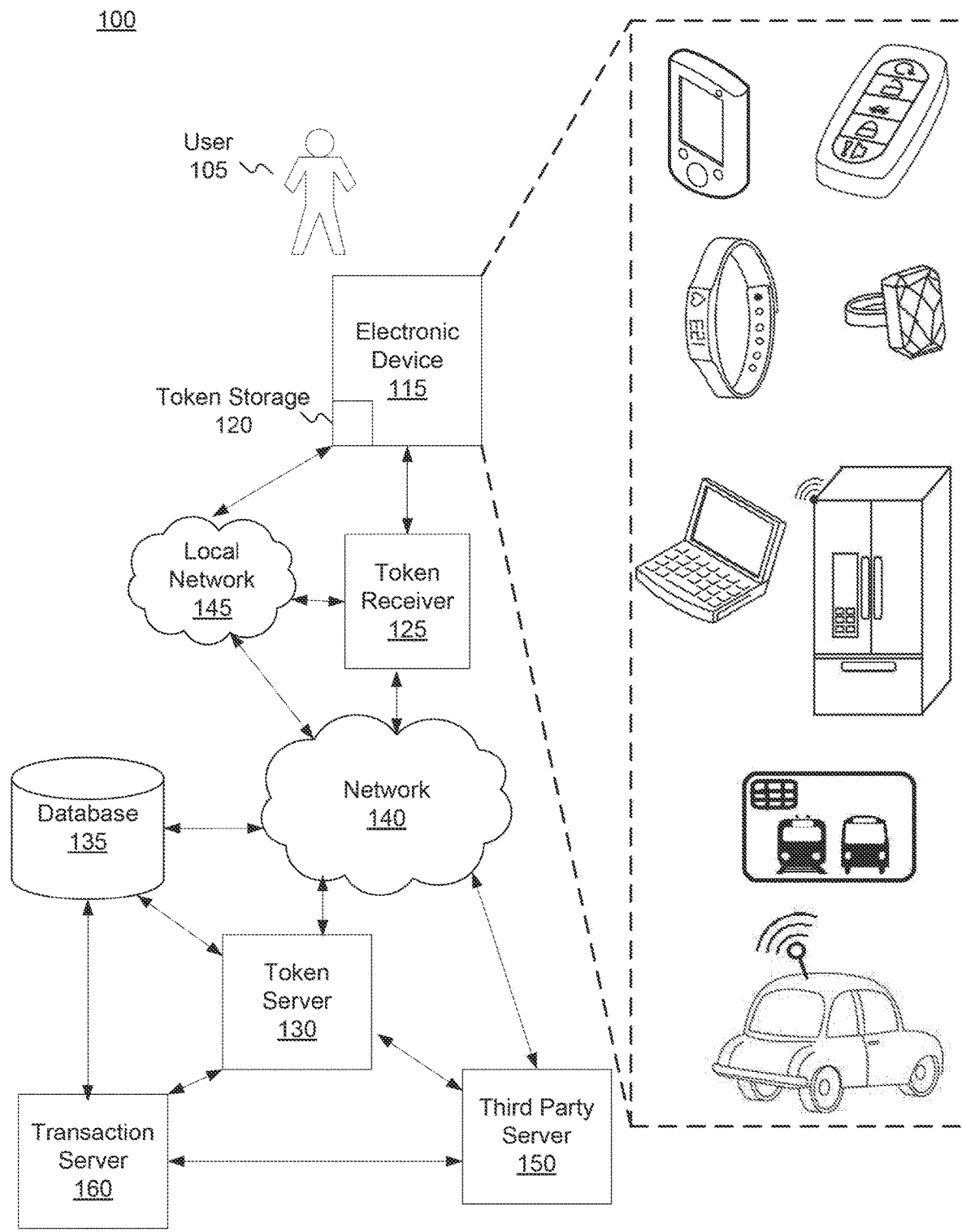
FIG. 1 is a diagram of an exemplary system that may be used for tokenized electronic device interaction management, consistent with disclosed embodiments.

Systems and methods are provided for generating dynamic and customizable electronic tokens, providing the generated tokens in an electronic device interaction to complete a transaction, and then managing the electronic token after completing the electronic device interaction.

In some embodiments, a processor may receive information about the pending transaction, and generate the electronic token based on data extracted from the transaction information. While generating the electronic token, the processor may set custom parameters and settings for the electronic token based on information about the electronic devices in the interaction, details about the pending transaction, and any other information that is useful for generating a customized and dynamic electronic token. The generated token is thus linked to particular details of the transaction, and the electronic token cannot be used to complete fraudulent transactions, in the event the token is compromised. Furthermore, the customized settings and parameters for electronic tokens provide the disclosed embodiments with significant advantages over traditional electronic tokens. For example, traditional electronic tokens are usually constrained to a predefined number of authorizations, or a predefined expiration date, and complex purchase transactions often result in unnecessary denials and multiple token generation, which places undue burdens on token generation/processing computer systems and the associated communication networks.

The generated electronic token may then be provided to the electronic device for use in the transaction. In some embodiments, an electronic device may transmit the generated token during an electronic device interaction such as a secure communication session. The secure communication session may include a wireless link between a user device such as a mobile phone and a terminal device in physical proximity to the user device. In some embodiments, the secure communication may include a secure or encrypted exchange over the Internet using a computer application or web browser. In both embodiments, a token server may receive the token during the electronic device interaction, and the token server may verify the origin and security of the electronic token. For example, the token server may confirm that the electronic token was presented by a specific electronic device, that a user entered proper authentication information such as a biometric scan, password, or pattern, and may confirm that the electronic token is being presented in connection with the transaction for which it was generated. The token server may authorize or deny the transaction based on the received token and information received with the token. After the electronic device transmits the generated token, the communication session between the electronic devices may end. In some embodiments, the communication session may end following authorization or denial of the transaction as received from the token server.

An authorized transaction may include multiple additional authorizations before the entire purchase transaction is complete, in a scenario rooted in Internet-based purchase transactions. For example, a purchase transaction may include multiple items, some of which are unavailable or backordered. As another example, a single purchase transaction from a merchant aggregator such as eBay or Amazon may include multiple items from different merchants that will be shipped at different times, requiring multiple authorizations by multiple parties that may differ from the original purchase transaction authorization. In contrast to the challenges rooted in Internet-based transactions, purchase transactions in physical stores usually involve an immediate purchase of items or services from a single merchant that are available at the store, and therefore traditional purchases do not involve the technical problems addressed by the disclosed embodiments.

The token server may manage the electronic token and handle subsequent authorizations associated with the purchase transaction. In some embodiments, the token server may be aware of a number of items in the original purchase transaction, estimated shipping times of the purchased items, total or individual value amounts of the purchased items, and any other relevant details of the purchase transactions. The token server may receive such information at the time the electronic token is generated, and may store the received information for subsequent authorization processing.

When the token server receives subsequent authorization requests for items in the purchase transaction, the token server may use the stored information and custom settings/parameters associated with the electronic token to determine whether the additional requests should be authorized or denied. The token server may also lock or deactivate an electronic token when the token server determines that the entire purchase transaction is complete, or if the token server detects fraudulent activity associated with the electronic token. The token server may deactivate the electronic token without affecting the status and functionality of the underlying user account, and without compromising any sensitive information.

In some embodiments, the token server may possess sufficient details about the purchase transaction to selectively deny and block fraudulent or erroneous authorization requests, while accepting valid authorization requests associated with the purchase transaction. Thus, the disclosed embodiments provide for enhanced computer system functionality to perform and manage token-based electronic device interactions, while reducing or eliminating processor and network burdens associated with unnecessary redundant token generation and processing.

Reference will now be made in detail to exemplary embodiments, examples of which are illustrated in the accompanying drawings and disclosed herein. Wherever convenient, the same reference numbers will be used throughout the drawings to refer to the same or like parts.

FIG. 1 shows a diagram of an exemplary system 100 that may be configured to perform one or more processes for tokenized electronic device interaction management. The components and arrangements shown in FIG. 1 are not intended to limit the disclosed embodiments, as the components used to implement the disclosed processes and features may vary.

In accordance with disclosed embodiments, system 100 may include an electronic device 115, a token receiver 125, a token server 130, a database 135, a network 140, a local network 145, a third party server 150, and a transaction server 160. Other components known to one of ordinary skill in the art may be included in system 100 to gather, process, transmit, receive, and provide information used in conjunction with the disclosed embodiments.

Electronic device 115 may include computerized systems or devices that are used for transactions associated with an account. Electronic device 115 may be associated with a user 105. In some embodiments, user 105 is associated with one or more accounts, such as an identification account, a security access account, a membership account, a credit card account, a debit card account, a checking or savings account, a gift card account, or any other type of account that can be identified using account number or ID. In some embodiments, electronic device 115 may include a token storage 120, which may be a dedicated memory, a partition of a memory, or a data entry in a memory, for temporarily storing one or more electronic tokens.

Electronic device 115 may be a personal computing device such as, for example, a mobile device with computing ability, a tablet, smartphone, wearable device such as Google Glass™ or a smart watch, a notebook computer, a medical ID bracelet, a chip such as a flash drive, a wristband for an attraction or resort such as a Disney® MagicBand™, or any combination of these devices and/or affiliated components. In one embodiment, electronic device 115 may be a mobile computer device that is operated by user 105 who is associated with at least one account. In some embodiments, electronic device 115 is an electronic device capable of storing and transmitting account information, such as an electronic token associated with the account.

In some embodiments, electronic device 115 may comprise any type of device capable of receiving, storing, and transmitting an electronic token. Some non-limiting examples may include "Internet-of-Things"-type devices, such as jewelry with embedded electronics, and "smart" appliances such as refrigerators, transit cards, and automobiles or vehicles. In some embodiments, "smart" clothing such as shoes or jackets may include circuitry capable of storing and transmitting one or more tokens.

While the exemplary embodiments are described as using wireless transmission circuitry for communicating electronic tokens, those of ordinary skill in the art will recognize that electronic tokens can be transmitted using one or more other data transmission means, such as magnetic stripe and reader, wired transmission, and optical transmission including infrared, barcode/QR code, or optical light transmission.

In some embodiments, electronic device 115 may comprise one or more computerized devices configured to provide account information via network 140 using an application such as a web browser. Electronic device 115 may be a computer-based system including computer system components, desktop computers, workstations, tablets, hand held computing devices, memory devices, and/or internal network(s) connecting the components.

Token receiver 125 may comprise one or more devices configured to receive an electronic token from electronic device 115. In some embodiments, token receiver 125 may comprise a wireless receiver or transceiver that receives an electronic token transmitted from electronic device 115, or interrogates electronic device 115 to retrieve an electronic token. In other embodiments, token receiver 125 may comprise a device that receives one or more electronic tokens by means other than wireless transmission, such as a magnetic stripe reader or wired receiver. In some embodiments, token receiver 125 may be built into another device such as a point-of-sale terminal, a security door, a membership sign-in station, or a transit turn-style. In some embodiments, token receiver 125 may be a wireless receiver or transceiver connected to or built into a personal computer or laptop computer associated with user 105. Token receiver 125 may be configured to communicate with a tokenized device such as a wristband, smartwatch, mobile device, wireless credit card, and any other tokenized device capable of use with disclosed embodiments. In other embodiments, token receiver 125 may comprise a standalone device in communication with another computer or device, such as token server 130. In some embodiments, token receiver 125 may be configured to receive an electronic token from electronic device 115, and provide the electronic token to token server 130 for processing a purchase transaction.

Token server 130 may include one or more computer-based systems including computer system components, desktop computers, workstations, tablets, hand held computing devices, memory devices, and/or internal network(s) connecting the components. Token server 130 may be owned and/or operated by an entity responsible for issuing and maintaining one or more accounts associated with user 105. In some embodiments, token server 130 is associated with one or more of a membership facility (such as, e.g., a fitness center), a government organization (such as, e.g., a state government or department of motor vehicles), a bank, a credit card company, a hotel, or any other entity that may issue and maintain one or more accounts. In some embodiments, token server 130 may generate and/or manage one or more electronic tokens associated with the accounts. The electronic tokens may include a reference or pointer to account information associated with the account. For example, the electronic token may provide a reference number pointing to a specific account number, without including the actual account number. Thus, devices that store and transmit the electronic tokens may provide for secure transactions without providing sensitive account information.

Database 135 may include one or more memory devices that store data and instructions used to perform one or more features of the disclosed embodiments. Database 135 may also include any combination of one or more databases controlled by memory controller devices (e.g., server(s), etc.) or software, such as document management systems, Microsoft SOL databases, SharePoint databases, Oracle™ databases, Sybase™ databases, or other relational databases. In some embodiments, database 135 may comprise an associative array architecture, such as a key-value storage, for storing and rapidly retrieving large amounts of information about an individual. In some embodiments, database 135 may store information associated with one or more accounts, and electronic token information associated with electronic device 115.

Network 140 may comprise any type of computer networking arrangement used to exchange data. For example, network 140 may be the Internet, a private data network, virtual private network using a public network, and/or other suitable connection(s) that enables system 100 to send and receive information between the components of system 100. Network 140 may also include a public switched telephone network ("PSTN") and/or a wireless network such as a cellular network, WiFi network, or other known wireless network capable of bidirectional data transmission.

Local network 145 may comprise any type of computer networking arrangement used to exchange data in a localized area, such as WiFi, Bluetooth™, Ethernet, and other suitable network connections that enable components of system 100 to interact with one another and to connect to network 140 for interacting with components in system 100. In some embodiments, local network 145 comprises a portion of network 140. In other embodiments, components of system 100 may communicate via network 140, without a separate local network 145.

Third party server 150 may be owned, operated, and/or associated with a third-party entity involved in one or more transactions initiated by user 105 using an account transaction device such as electronic device 115. For example, when token server 130 is associated with a bank, third party server 150 may be associated with a merchant, vendor, or another bank associated with another party to a financial transaction other than user 105.

Transaction server 160 may comprise one or more computing systems operated by an entity associated with token server 130. In some embodiments, transaction server 160 may comprise a local or remote computing system that handles transactions that are detokenized by token server 130. In some embodiments, transaction server 160 may receive electronic tokens directly from electronic device 115. For example, electronic device 115 may comprise a notebook or desktop computer configured to initiate purchase transactions via network 140. In such embodiments, electronic device 115 may provide an electronic token directly to transaction server 160 to complete the purchase transaction. As another example, electronic device 115 may comprise a smart appliance such as a refrigerator configured with software capable of ordering items via network 140. The smart appliance may provide an electronic token to transaction server 160, to complete the purchase transaction.

In some embodiments, transaction server 160 and third-party server 150 may be the same server, and in other embodiments they may comprise different computing systems operated by different entities. For example, in a mobile payment environment, transaction server 160 may comprise a computing system that processes payment or mobile banking requests that are detokenized by token server 130, and third-party server 150 may comprise a computing system operated by a card issuer, that routes transaction requests between merchants and token server 130. In some embodiments, transaction server 160 may approve or deny requests to provide different types of information, such as identity and credential information, financial information, access information, and any other type of information that an individual or organization may wish to restrict to certain recipients.

Figure 2:
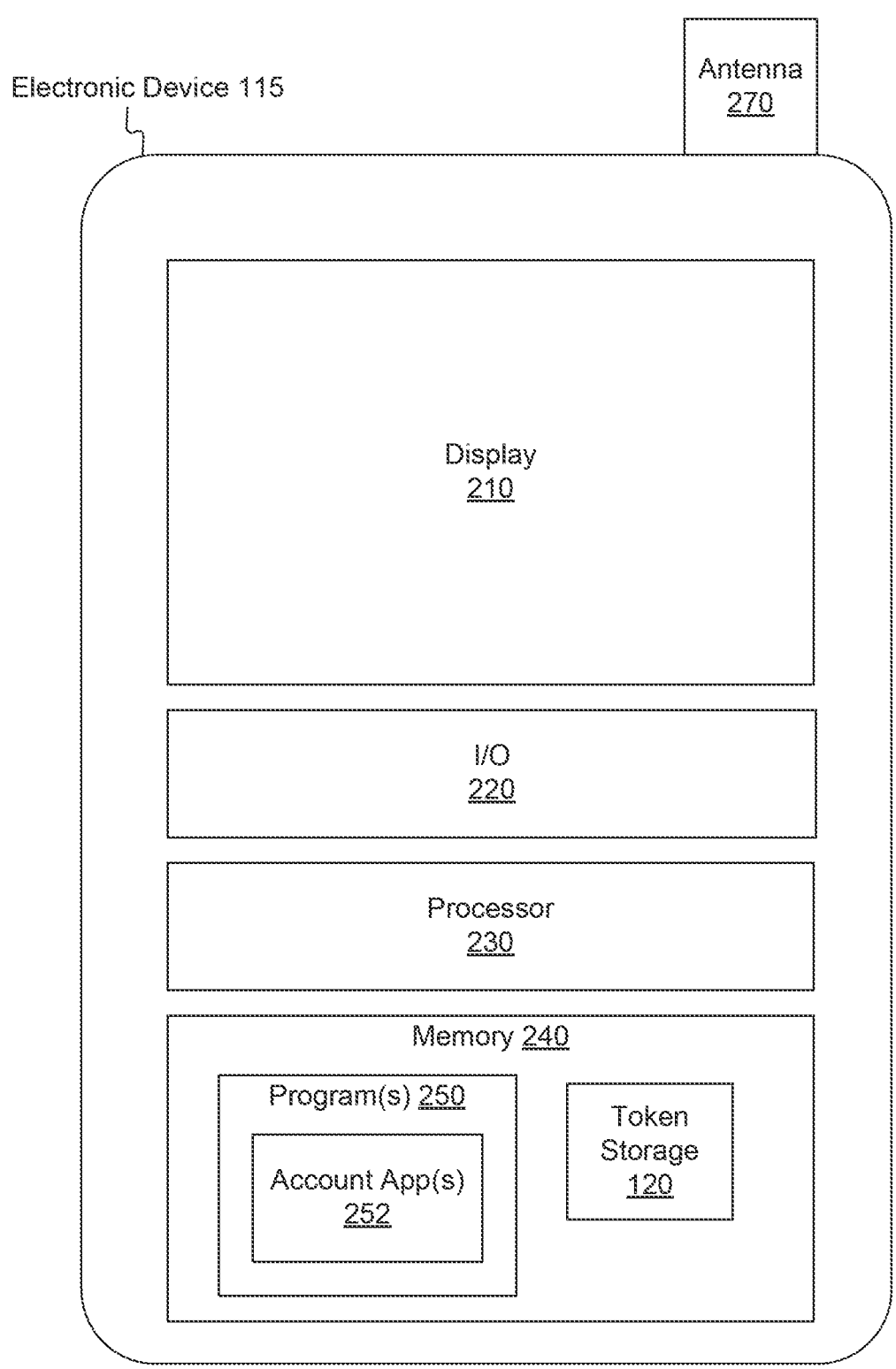
FIG. 2 is a diagram of an electronic device, consistent with disclosed embodiments.

FIG. 2 shows a diagram of an exemplary electronic device 115, consistent with disclosed embodiments. Electronic device 115 can include any type of mobile device capable of receiving, storing, and/or providing account token(s) in the disclosed methods. In some embodiments, electronic device 115 is a mobile personal computing device such as a smartphone, mobile phone, tablet computer, smartwatch, smart glasses, and any other known or future format of portable electronic computing device. In some embodiments, electronic device 115 is a device that has a primary purpose other than performing general computing tasks, yet possesses sufficient computing power and components to store and provide account token(s). Examples of such embodiments may include an electronic car key, a wearable fitness device having a transceiver, a security door fob, an electronic account card, or any other portable electronic device having at least a memory and a wireless transceiver. While the exemplary embodiments are described as using wireless transmission circuitry for communicating electronic tokens, those of ordinary skill in the art will recognize that electronic tokens can be transmitted using one or more other data transmission means, such as magnetic stripe and reader, wired transmission, and optical transmission including infrared, barcode/QR code, or optical light transmission.

As shown in FIG. 2, electronic device 115 may include a display 210, input/output ("1/0") devices 220, one or more processors 230, a memory 240 having stored thereon one or more programs 250, such as an account app 252, and may further include a transceiver including an antenna 270.

Display 210 may include one or more known devices such as, for example, one or more LED indicator lights, a segmented LED display, an LCD screen, an Organic LED (OLEO) screen, or any other type of display capable of providing information.

I/O devices 220 may include one or more devices that allow electronic device 115 to receive input from user 105 and provide feedback to user 105. I/O devices 220 may include, for example, one or more buttons, switches, speakers, microphones, or touchscreen panels. In some embodiments, I/O devices 220 may be manipulated by user 105 to input information into electronic device 115. For example, when electronic device 115 is a smart phone, I/O devices 220 may include physical buttons on the smartphone, a microphone, a speaker, touchscreen, camera, or sensor. As another example when electronic device 115 is a car key, I/O devices 220 may include buttons on the car key such as the lock, unlock, and panic buttons. As another example, when electronic device 115 is a wearable fitness device such as a Fitbit™ wristband, I/O devices 220 may include physical buttons and an accelerometer shocksensor.

Processor 230 may be one or more known processing devices, such as a microprocessor manufactured by Qualcomm™, Intel™, AMO™, Samsung, and other known processing device manufacturers. Processor 230 may constitute a single core or multiple core processors that executes parallel processes simultaneously. For example, processor 230 may be a single core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc. multiple software processes, applications, programs, etc. In another embodiment, processor 230 may include a multiple-core processor arrangement (e.g., dual, quad core, etc.) configured to provide parallel processing functionalities to allow electronic device 115 to execute multiple processes simultaneously. In some embodiments, processor 230 may comprise a System on Chip (SoC) or System in Package (SiP) One of ordinary skill in the art would understand that other types of processor arrangements could be implemented that provide for the capabilities disclosed herein.

Memory 240 may be a volatile or non-volatile, magnetic, semiconductor, tape, optical, removable, non-removable, or other type of storage device or tangible (i.e., non-transitory) computer-readable medium that stores data, one or more program(s) 250 such as account app 252, and token storage 120. Stored data may include, for example, user 105's personal information, one or more electronic tokens associated with one or more accounts, and display settings and preferences.

In some embodiments, electronic tokens may include informational items such as, for example, an alphanumeric reference number that points to an account, an account label, account issuance date, account expiration date, account issuer identification, and any other necessary information associated with user 105 and/or an account associated with user 105, without including highly sensitive information such as an actual account number. Thus, the electronic token may include information that points to an account, without providing sensitive account information that, if compromised, would sacrifice the integrity or security of the account.

In some embodiments, token storage 120 may comprise a dedicated memory chip, such as a secure memory chip, with a primary function of storing one or more electronic tokens received from token server 130 or generated by processor 230. In other embodiments, token storage 120 may be a partition or address included within memory 240.

Program(s) 250 may include operating systems (not shown) that perform known operating system functions when executed by one or more processors. By way of example, the operating systems may include Microsoft Windows™, Unix™, Linux™, Apple™ operating systems, Personal Digital Assistant (PDA) type operating systems, such as Microsoft Mobile™, or other types of operating systems. Accordingly, disclosed embodiments may operate and function with computer systems running any type of operating system. Electronic device 115 may also include communication software that, when executed by a processor, provides communications with network 140, such as Web browser software, tablet, or smart hand held device networking software, etc. Electronic device 115 may be a device that executes mobile applications for performing operations consistent with disclosed embodiments, such as a tablet or mobile device. In some embodiments, programs 250 may include basic operating logic for performing functions associated with electronic device 115 such as logic for locking and unlocking doors and starting a car (for a car key), tracking fitness data (for a wearable fitness device), detecting a nearby wireless antenna and transmitting stored information (for a security key fob).

Program(s) 250 may include account app(s) 252, such as an app for receiving, storing, transmitting, and managing an electronic token. In some embodiments, account app 252 may include instructions that cause processor 230 to connect to store a received electronic token, recall a stored token from memory, and provide the stored electronic token. In some embodiments, account app 252 may allow user 105 to configure one or more settings associated with the token and/or other tokens. For example, account app 252 may analyze information in a checkout or shopping cart screen on electronic device 115, and "scrape" information from the screen to provide to token server 130, or provide for display one or more fillable forms to receive information from user 105 about a pending transaction.

In some embodiments, electronic device 115 may include one or more sensors (not shown in figure). Sensors may include one or more devices capable of sensing the environment around electronic device 115 and/or movement of electronic device 115. In some embodiments, sensors 280 may include, for example, an accelerometer, a shock sensor, a gyroscope, a position sensor, a microphone, an ambient light sensor, a temperature sensor, a GPS receiver, and/or a conductivity sensor. In some embodiments, sensor 280 may collect biometric information from user 105, such as a fingerprint reading, retina eye scan, or physiological waveform such as an ECG or EKG waveform.

Figure 3:
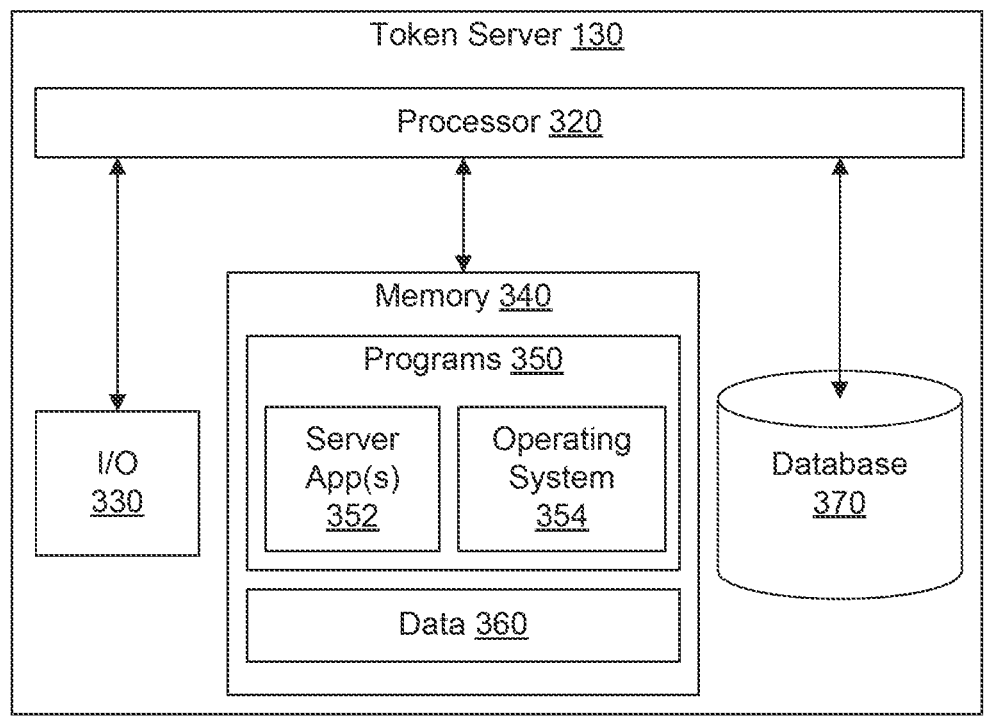
FIG. 3 is a diagram of an exemplary token server, consistent with disclosed embodiments.

FIG. 3 is a diagram of an exemplary token server 130 consistent with disclosed embodiments. As shown, token server 130 may include one or more processors 320, input/output ("1/0") devices 330, memory 340 storing data 360 and programs 350 (including, for example, server app(s) 352 and operating system 354), and a database 370. Token server 130 may be a single server or may be configured as a distributed computer system including multiple servers or computers that interoperate to perform one or more of the processes and functionalities associated with the disclosed embodiments.

Processor 320 may be one or more known processing devices, such as a single- or multiple-core processor that executes parallel processes simultaneously. For example, processor 320 may be a single core processor configured with virtual processing technologies. In certain embodiments, processor 320 may use logical processors to simultaneously execute and control multiple processes. Processor 320 may implement virtual machine technologies, or other known technologies to provide the ability to execute, control, run, manipulate, store, etc. multiple software processes, applications, programs, etc. In another embodiment, processor 320 may include a multiple-core processor arrangement (e.g., dual core, quad core, etc.) configured to provide parallel processing functionalities to allow token server 130 to execute multiple processes simultaneously. One of ordinary skill in the art would understand that other types of processor arrangements could be implemented that provide for the capabilities disclosed herein.

Token server 130 may also include one or more I/O devices 330 that may comprise one or more interfaces for receiving signals or input from devices and providing signals or output to one or more devices that allow data to be received and/or transmitted by token server 130. For example, token server 130 may include interface components that provide interfaces to one or more input devices, such as one or more keyboards, mouse devices, and the like, that enable token server 130 to receive input from an employee of the financial service provider (not shown) or other operator of server 130.

Token server 130 may include one or more storage devices configured to store information used by processor 320 (or other components) to perform certain functions related to the disclosed embodiments. In one example, token server 130 may include memory 340 that includes instructions to enable processor 320 to execute one or more applications, such as server applications, an electronic transaction application, an account status application, network communication processes, and any other type of application or software known to be available on computer systems. Alternatively or additionally, the instructions, application programs, etc. may be stored in an internal database 370 or external storage (not shown) in direct communication with token server 130, such as one or more database or memory accessible over network 140. Database 370 or other external storage may be a volatile or non-volatile, magnetic, semiconductor, tape, optical, removable, non-removable, or other type of storage device or tangible (i.e., non-transitory) computer-readable medium.

In one embodiment, memory 340 includes instructions that, when executed by processor 320, perform one or more processes consistent with the functionalities disclosed herein. Methods, systems, and articles of manufacture consistent with disclosed embodiments are not limited to separate programs or computers configured to perform dedicated tasks. For example, memory 340 may include one or more programs 350 to perform one or more functions of the disclosed embodiments. Moreover, processor 320 may execute one or more programs located remotely from account information display system 100. For example, token server 130 may access one or more remote programs, that, when executed, perform functions related to disclosed embodiments.

Programs 350 may include one or more server app(s) 352 and operating system 354. Server app(s) 352 may incorporate one or more account information apps that cause processor(s) 320 to execute one or more processes related to managing or transmitting account information including, but not limited to, managing one or more electronic account database entries, generate one or more electronic tokens associated with an account, transmit the generated electronic token to an electronic device 115, generate one or more interfaces for controlling activation statuses of the generated electronic tokens, and for managing one or more settings for each of the electronic tokens.

Memory 340 and database 370 may include one or more memory devices that store data and instructions used to perform one or more features of the disclosed embodiments. Memory 340 and database 370 may also include any combination of one or more databases controlled by memory controller devices (e.g., server(s), etc.) or software, such as document management systems, Microsoft SOL databases, SharePoint databases, Oracle™ databases, Sybase™ databases, or other relational databases.

Token server 130 may also be communicatively connected to one or more remote memory devices (e.g., remote databases (not shown)) through network 140 or a different network. The remote memory devices may be configured to store information and may be accessed and/or managed by token server 130. By way of example, the remote memory devices may be document management systems, Microsoft SOL database, SharePoint databases, Oracle™ databases, Sybase™ databases, or other relational databases. Systems and methods consistent with disclosed embodiments, however, are not limited to separate databases or even to the use of a database.

Figure 4:
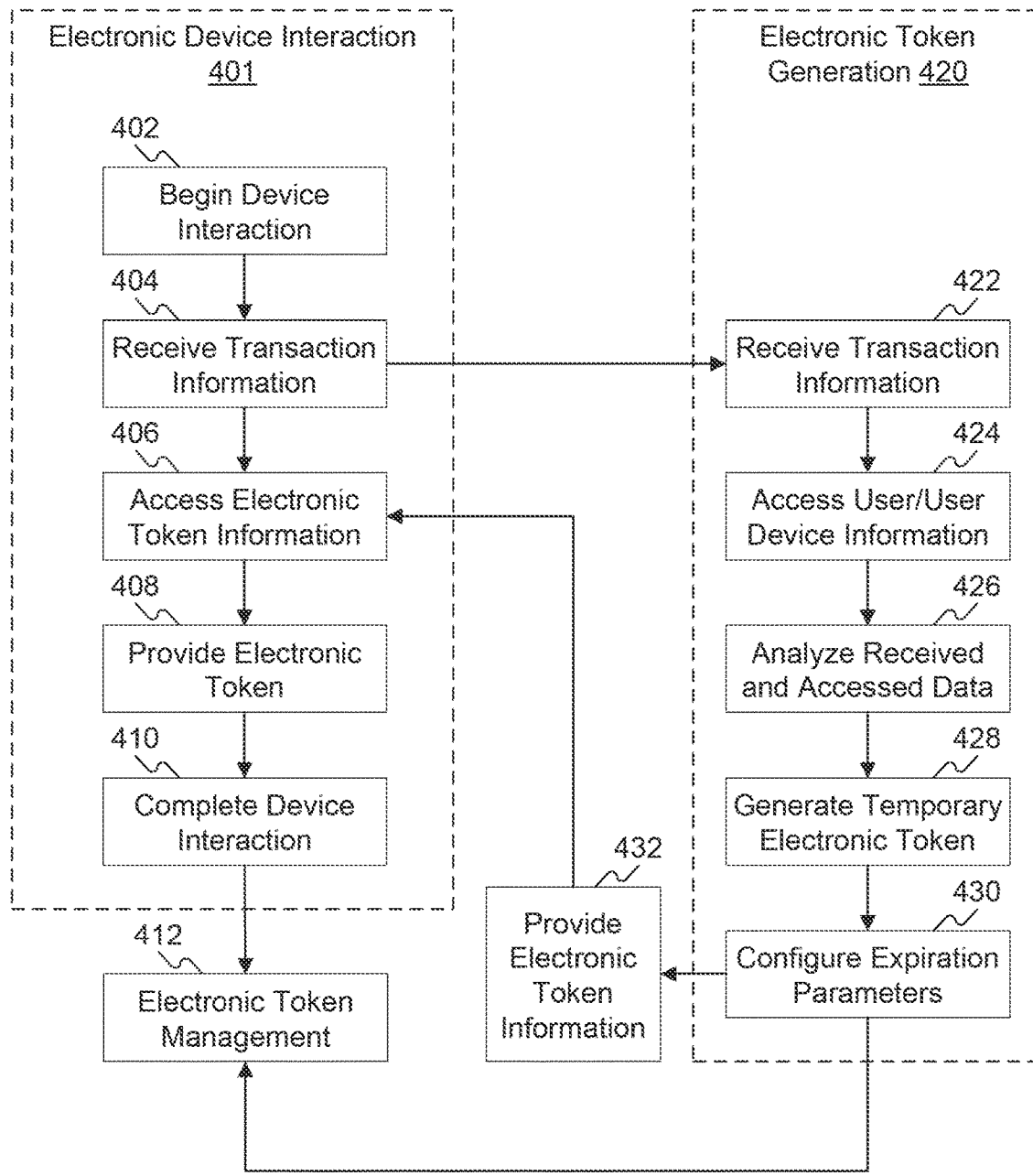
FIG. 4 is a flowchart of an exemplary tokenized electronic device interaction process, consistent with disclosed embodiments.

FIG. 4 is a flowchart of an exemplary token generation and tokenized electronic device interaction process 400. In some embodiments, process 400 may provide electronic device 115 with an electronic token associated with one or more accounts associated with user 105. Process 400 is discussed below as being performed by a combination of electronic device 115 and token server 130. In some embodiments, some or all of the steps of process 400 may be performed by electronic device 115, such as, for example, electronic device 115, or any other individual or distributed computing systems (not shown in figures).

Process 400 may comprise multiple sub-processes, such as electronic device interaction process 401, electronic token generation process 420, and electronic token management process 412.

Process 400 may begin in step 402, when electronic device 115 and/or token receiver 125 begins device interaction between the electronic device 115 and a remote device such as token receiver 125. In some embodiments, electronic device 115 may interact directly with a remote device such as third party server 150. Thus, for discussion purposes the description below describes an interaction between electronic device 115 and third party server 150. In some embodiments, electronic device 115 may initiate the interaction by sending a "handshake" to third party server 150, or user 105 may navigate to a website or application associated with third party server 150. For example, user 150 may use a browser operating on electronic device 115 to access, via the Internet or other type of network 140, a website associated with third party server 150. Electronic device 115 may provide information to third party server 150 indicating that user 105 desires to complete a purchase transaction.

In step 404, electronic device 115 may receive transaction information associated with a pending electronic transaction. In some embodiments, transaction information may comprise a description of an item or service to be purchased, a price of the item or service, a merchant associated with the item or service, and availability information including an expected ship or delivery date. Electronic device 115 may receive the transaction information from third party server 150 or another web server associated with the items/services to be purchased. In some embodiments, transaction information may also include a total value amount for multi-item orders. Notably, the transaction information is received before completion of the electronic transaction, such as on a "checkout" or "shopping cart" webpage.

In traditional systems, a computer may simply provide sensitive account information or a basic electronic token to complete the purchase transaction. However, such traditional systems either risk compromising sensitive information for the account or the user, or provide electronic tokens that are likely to expire prematurely, resulting in unnecessary declined communications and the need for additional token generation which, at large volumes, results in diminished computer and network performance for backend transaction processing systems. Systems and processes described herein address these technical problems with improvements to electronic token systems.

In step 406, electronic device 115 may access electronic token information to complete the transaction. In some embodiments, processor 230 in electronic device 115 may perform process 420 and generate the electronic token within electronic device 115. In such embodiments, electronic device 115 may simply buffer and/or temporarily store the generated electronic token in token storage 120. In other embodiments, token server 130 may generate the electronic token after performing some or all of process 420. In such embodiments, electronic device 115 may receive or request an electronic token from token server 130 in response to providing transaction information. Electronic device 115 may temporarily store or buffer the electronic token in token storage 120, or electronic device 115 may relay the electronic token without prior storage.

In step 408, electronic device 115 provides the generated electronic token to third party server 150 (or token receiver 125 in relevant embodiments). In some embodiments, token server 130 may provide an electronic token directly to third party server 150. In some embodiments, providing the electronic token to third party server 150 may indicate that payment using an account associated with the electronic token is already pre-approved. In other embodiments, the electronic token may merely comprise payment information that third party 150 must use to seek authorization for payment.

In step 410, process 401 may complete, with electronic device 115 completing its interaction with the transaction server 160 or token receiver 125. Thereafter, the devices may cease communication and subsequent handshakes, and process 400 may proceed to electronic token management process 412. In some embodiments, step 410 may occur after a predetermined amount of time or after a particular event. For example step 410 may occur after electronic device 115 receives a notification from token server 130, third party server 150, and/or transaction server 160 that the purchase transaction is complete and payment is approved. In other embodiments, step 410 may occur immediately after electronic device 115 provides the electronic token to third party server 130.

During electronic device interaction process 401, processor 230 of electronic device 115 or token server 130 may perform some or all of electronic token generation process 420. For example, in some embodiments, electronic device 115 may perform process 420 if a connection to network 140 and/or token server 130 is unavailable. For discussion purposes, token server 130 performs process 420 in the example described below.

Process 420 may begin in step 422, when token server 130 receives transaction information. Token server 130 may receive transaction information from electronic device 115 as part of a request for an electronic token. In some embodiments, token server 130 may receive transaction information directly from third party server 150. Transaction information may include, for example, an item count in a pending purchase transaction, particular SKU numbers for items in the purchase transaction or a quantity of SKUs associated with the items in the purchase transaction, estimated shipment dates for some of all items in the pending purchase transaction, a stock status of items in the pending purchase transaction (e.g., "in stock," "backordered," "out of stock," etc.), and one or more merchant IDs associated with the items in the pending purchase transaction. In some embodiments, transaction information may include more or fewer types of information depending on the information provided from electronic device 115 and the nature of the purchase transaction.

Token server 130 may obtain transaction information from electronic device 115 in a number of different ways. As one example, transaction information maybe included within an authorization request from electronic device 115 or third party server 150. As another example, electronic device 115 may execute one or more applications, plug-ins, or web extensions for a web browser, to "scrape" or extract relevant information displayed in the browser, and provide the scraped information to token server 130. In such an example, the application/web extension may analyze content displayed on a "checkout" or "shopping cart" screen using a semantic engine or html code analyzer, and recognize transaction information keywords or symbols. In some embodiments, electronic device 115 may forward partial or entire screen shots of a checkout or shopping cart webpage to token server 130, and token server 130 may analyze and extract relevant data.

In some embodiments, upon receiving an electronic token request, token server 130 may query electronic device 115 for transaction information. In such embodiments, electronic device 115 may present a fillable form to user 105, to solicit the necessary information from user 105.

In step 424, token server 130 accesses information about user 105 and/or devices associated with user 105 such as electronic device 115. Token server 130 may query database 135 and receive the requested information. In some embodiments, the received information may include sensitive information such as identification information about user 105, verification information such as a date of birth, social security number, address, phone number, email address, biometric data such as fingerprints, retina scans, voice waveforms, EKG or ECG signatures, and any other information that can be compared against information collected by electronic device 115 to verify user 105's identity, when necessary. In some embodiments, user information may also include one or more account numbers, routing numbers, financial institution identifiers, expiration dates, security codes, spending limits, balances, and other sensitive information.

In some embodiments, user device information may include serial numbers, phone numbers, makes and models, IP addresses, and any other information that identifies devices such as electronic device 115 that are authorized for completing transactions on the associated account(s).

Notably, token server 130 may maintain all sensitive information for user 105, or access sensitive information from another networked server, to generate the token. The electronic token itself, however, may be devoid of any sensitive information, and therefore third party server 150 may never receive sensitive information during the electronic transaction.

In step 426 token server 130 may analyze the received transaction information and accessed user/user device information, to compile data in preparation for generating the electronic token. In some embodiments, token server 130 may employ one or more algorithms to parse received information to extract details about the pending transaction, verify the identity of user 105, or determine whether the requested transaction exceeds any limits on the associated account. If no problems are detected during the analysis, then process 420 may proceed to step 428.

In step 428, token server 130 generates the temporary electronic token. The electronic token may include an alphanumeric string or electronic file that includes pointers to sensitive account information, but does not comprise the sensitive information itself. In some embodiments, the electronic token may include encrypted data or strings generated by a hashing algorithm. In some embodiments, the electronic token may comprise a key or key value that token server 130 can translate to access sensitive information. The generated electronic token may include information specific to electronic device 115 and details about the purchase transaction, so that if the electronic token is compromised and presented from another device or for another transaction, token server 130 can automatically deny the request and flag the fraudulent activity.

In step 430, token server 130 configures expiration parameters associated with the new electronic token. Expiration parameters are determined based on the transaction information, and can also include settings related to user 105's account information. As an example if a pending purchase transaction includes five different items (i.e., five SKUs), token server 130 may set a maximum number of authorizations on the electronic token to five. As another example, if the transaction information indicates the shopping cart value is $800, then token server 130 may allow for up to $800 total in authorizations for the electronic token.

As yet another example, token server 130 may determine one or more estimated shipment dates of items in the shopping cart, and set an expiration date to a predetermined amount of time after the latest shipment date. In such embodiments, the electronic token may remain active if one or more items are backordered for extended amounts of time, whereas traditional electronic tokens may expire within a preset and non-customizable time period. In some embodiments, token server 130 may dynamically update and revise expiration parameters based on authorizations received for the electronic token, as discussed in further detail later.

In some embodiments, token server 130 may set default expiration parameters when token sever 130 has insufficient information to calculate customized parameters. For example, if received transaction information does not include any indication of stock status or estimated ship date, token server 130 may set a default expiration date (such as 180 days). Token server 130 may dynamically modify expiration parameters in process 412, based on information provided to token server 130 in subsequent transaction requests.

In some embodiments, token server 130 may apply one or more rule sets or employ algorithms to modify expiration parameters based on the needs of transaction server 160. For example, token server 130 may automatically impose a buffer percentage of authorizations or value, such as setting expiration parameters 10-20% higher than calculated amounts. In such embodiments, token server 130 may continue to approve authorizations even if there are relatively small changes in the purchase transaction. Such changes can occur due to price increases or shipping surcharges that are imposed on user 105, but within a predetermined tolerance to the original purchase amount.

As another example, token server 130 may include additional authorizations in the authorization limit to account for authorizations associated with returned items and exchanged items in the purchase transaction. For example, if user 105 returns an item, third party server 150 may transmit an authorization for the return transaction, to refund the item value. Thus, token server 130 may assign an authorization limit that is a multiple of the item count, such as twice the item count in the purchase transaction.

After configuring expiration parameters and any other associated settings for the electronic token, token server 130 may store the configured parameters and information about the electronic token in database 135 (not shown in figures). In step 432, token server 130 provides the generated electronic token to electronic device 115, and process 420 may end, with process 400 proceeding to electronic token management process 412.

Figure 5:
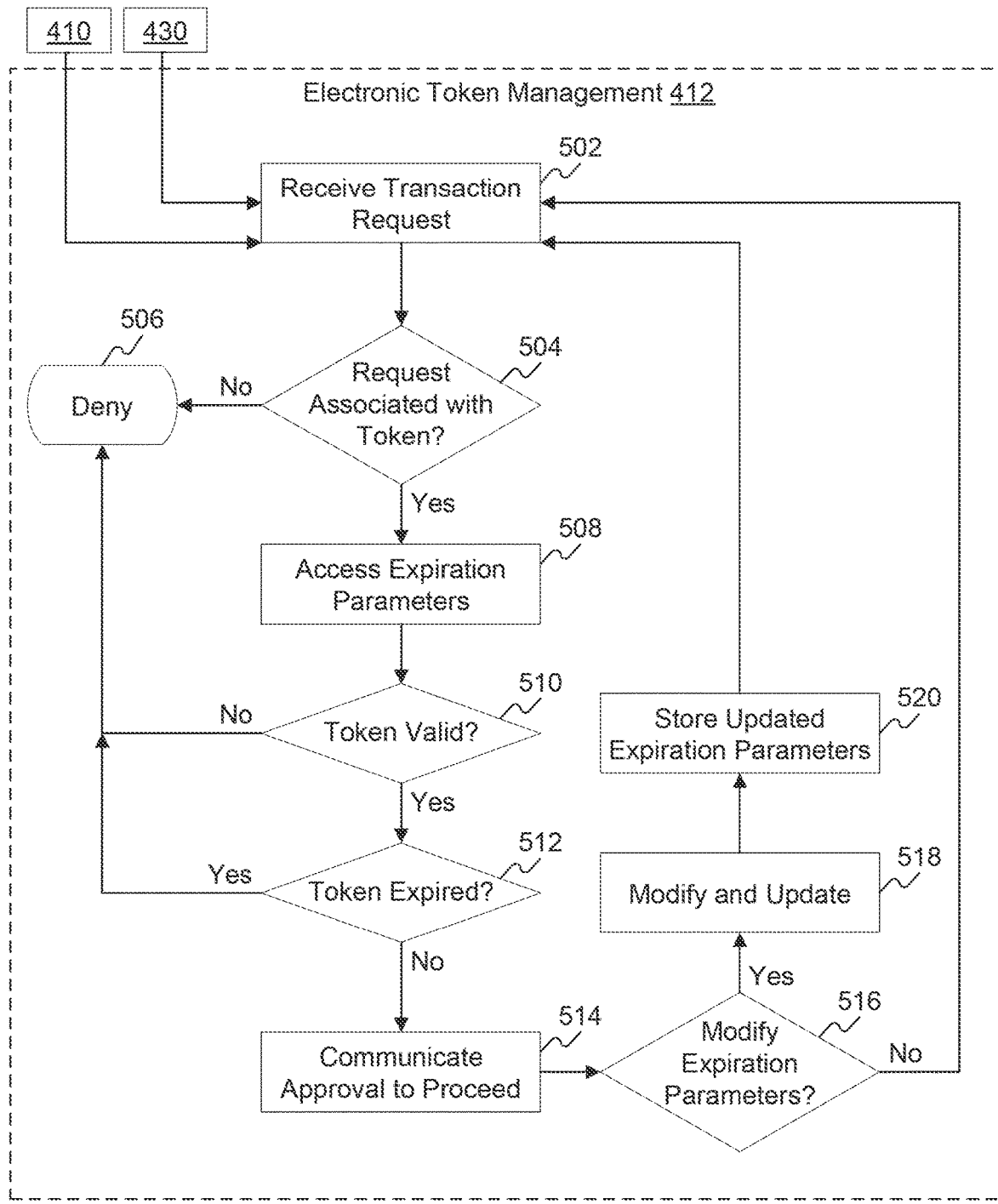
FIG. 5 is a flowchart of an exemplary electronic token management process, consistent with disclosed embodiments.

FIG. 5 is a flowchart of an exemplary electronic token management process 412. Token server 130 may perform some or all steps of process 412. In some embodiments, another computer or computer system such as transaction server 160 may perform some steps of process 412. For discussion purposes, process 412 is described below as performed by token server 130.

Process 412 may begin following step 410 or 430 of process 400 (FIG. 4). In step 502, token server 130 may receive a transaction request. Token server 130 may receive the transaction request from third party server 150 via network 140. Transaction request may include the electronic token which electronic device 115 previously presented to third party server 150 to perform a purchase transaction. The received transaction request may also include information about the transaction, such as an item count, merchant ID(s), item values, and/or total value. If the transaction request is the first instance that third party server 150 has provided the electronic token, the transaction request may include only a request to authorize the purchase transaction, whereas subsequent authorization requests will request payment for particular items as they ship to user 105. Subsequent transaction requests may include details about item(s) that shipped to user 105, such as item count, value, and associated merchant ID(s). Token server 130 may store received transaction information in database 135 (FIG. 1)).

In step 504, token server 130 analyzes the transaction request to verify that the request is associated with the electronic token provided with the transaction request. For example, token server 130 may recall information stored in database 135 in connection with the electronic token to verify that, at a threshold level, the transaction request is associated with the purchase transaction for which the electronic token was generated.

If the transaction request is not associated with the electronic token ("no" in step 504), such as when the received transaction request involves a purchase transaction with items and values other than those associated with the electronic token, then token server 130 may deny the transaction request (step 506), and process 412 may end.

If token server 130 determines that the received transaction request is properly associated with the received electronic token ("yes" in step 504), then in step 508 token server 130 may access expiration parameters associated with the electronic token. In some embodiments, token server 130 may query database 135 for expiration parameters configured in step 430 of FIG. 4, as well as other information associated with the electronic token.

In step 510, token server 130 may determine whether the electronic token is valid. In some embodiments, token server 130 may verify that the electronic token is an electronic token issued by token server 130, and verify that the electronic token is not fraudulent or fabricated. Token server 130 may employ one or more known fraud detection methods to analyze the electronic token and verify its validity. If the electronic token is not valid ("no" in step 510), then token server 130 may deny the transaction request (step 506), and process 412 may end. If the electronic token is valid ("yes" in step 510), then process 412 may proceed to step 512.

In step 512, token server 130 analyzes the accessed expiration parameters and the received transaction request, to determine whether the electronic token has expired under the expiration parameters. For example, token server 130 may determine whether a number of transaction requests and authorizations has exceeded the limit defined in the expiration parameters, or whether a value amount in the expiration parameters was already reached from previous transaction requests.

As another example, token server 130 may determine whether a total value of authorizations already made for the purchase transaction meet or exceed the predefined total value of the purchase transaction. If not, then token server 130 may estimate a value of the remaining authorizations, as a difference between the predefined total value minus the sum of previous authorizations.

As another example, token server 130 may determine whether the transaction request is received later than a specified expiration date or time. If the expiration date has passed, then token server 130 may deem the electronic token expired, and deny the transaction request. In some embodiments, however, token server 130 may extend an expiration date in the expiration parameters in certain situations. For example, if the expiration parameters include a predefined number of "shipment authorizations" and "return authorizations," token server 130 may extend the expiration date if "shipment authorizations" remain unused. That is, if token server 130 determines that all of the purchased items have not shipped, token server 130 may extend the pendency of the electronic token to provide additional time for the merchant to ship remaining items in the purchase transaction.

If token server 130 determines that the electronic token is expired ("yes" in step 512), then token server 130 may deny the transaction request (step 506), and process 412 may end.

If token server 130 determines that the electronic token has not expired ("no" in step 512), then process 412 may proceed to step 514. In some embodiments, token server 130 may determine that the electronic token has not expired if a number of authorizations to-date is less than an authorization limit. As another example, token server 130 may determine that the electronic token is not expired when the date of the current transaction request is prior to a stored expiration date for the token. Token server 130 may determine that the electronic token is not expired for additional reasons as well, based on a joint analysis of the transaction request and expiration parameters.

In step 514, token server 135 may send to transaction server 160 an approval message to proceed with the transaction. Token server 130 may also update information associated with the electronic token and purchase transaction in database 135 (not shown in figure). In some embodiments, token server 130 may transmit an approval message to transaction server 160, to process the transaction request. In other embodiments, token server 130 may provide an approval message to third party server 150.

In step 516, token server 130 may determine whether the expiration parameters associated with the electronic token require updates or modification. In some embodiments, token server 130 may determine that new information received in the transaction information warrants a change in the original expiration parameters for the electronic token. As an example, an original expiration date may require modification when subsequent transaction request information indicates that remaining items have newly assigned estimated shipping dates. As another example, transaction request information, or other information received from electronic device 115, transaction server 160, or third party server 150, may indicate that one or more items are no longer available, and were removed from the purchase transaction. In such embodiments, token server 130 may modify the expiration parameters to reduce the authorization limit and value amount of the purchase transaction. Through the use of modified/updated expiration parameters, the disclosed embodiments provide a dynamic electronic token that can adapt to different purchase transaction scenarios while maintaining the security of sensitive information and reducing data processing burdens on backend computer systems and networks from unnecessary transaction declines and redundant token generation.

If token server 130 determines that expiration parameter changes are not needed ("no" in step 516), then process 412 may return to step 502, when token server 130 receives the next transaction request.

If token server 130 determines that expiration parameter changes are needed ("yes" in step 516), then in step 518 token server 130 may update and modify the expiration parameters for the electronic token. Updates and modifications may be determined and implemented similar to step 430 of FIG. 4. Token server 130 may store the updated expiration parameters in step 520, and process 412 may return to step 502, when token server 130 receives the next transaction request.

Figure 6:
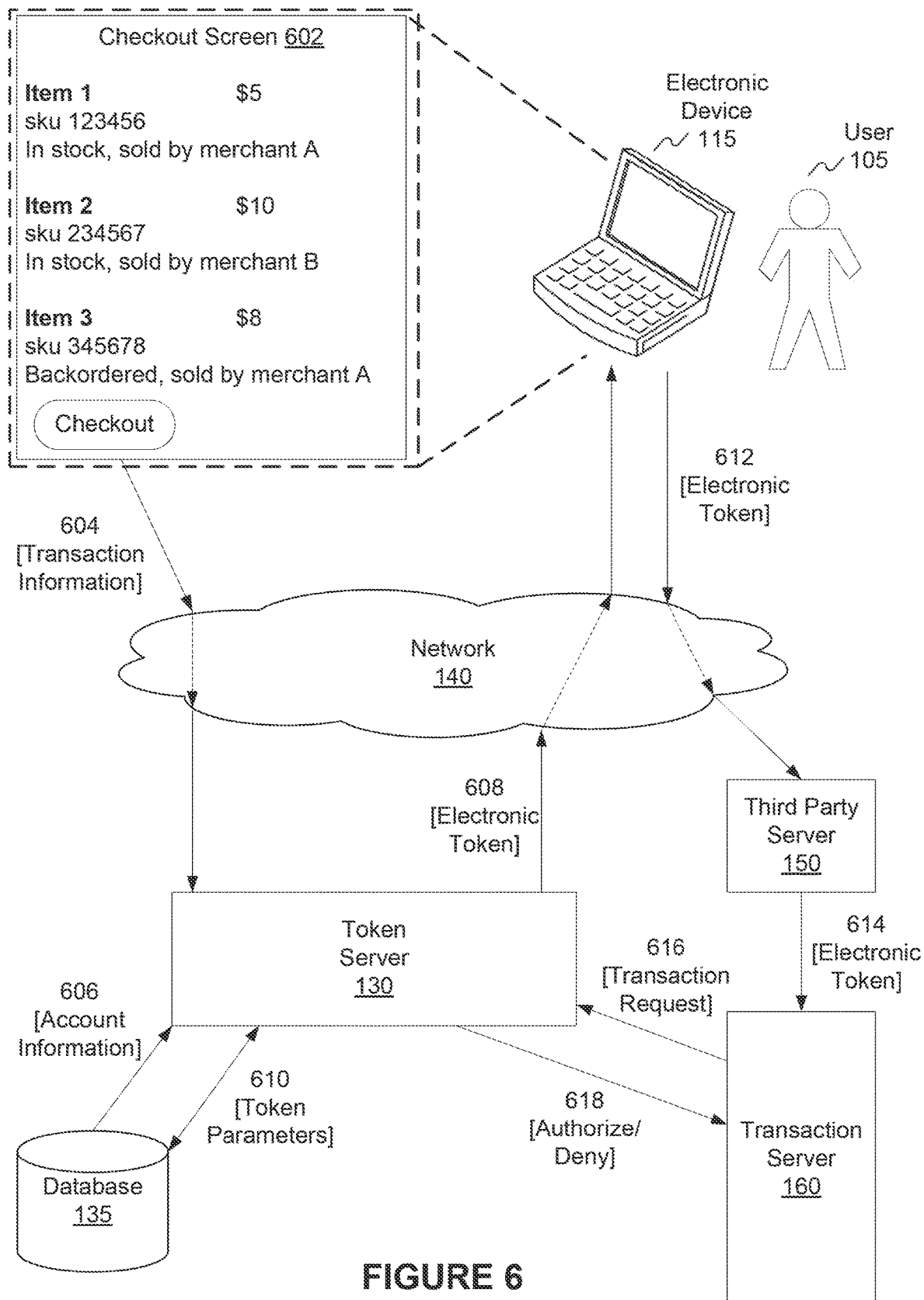
FIG. 6 is a diagram of an exemplary data flow during an exemplary electronic device interaction and token generation and management process, consistent with disclosed embodiments.

FIG. 6 is a diagram of an exemplary data flow during an exemplary electronic device interaction and token generation and management process. As shown, user 105 may operate electronic device 115, and electronic device 115 may execute an application such as a web browser with one or more web extensions for conducting purchase transactions using electronic tokens. The web browser may display a checkout screen 602, in which user 105 is preparing to purchase three items with different values and SKUs. In the example shown, items 1 and 2 are in-stock, and item 3 is backordered. After user 105 enters authentication information such as a password or biometric data, the web extension may instruct electronic device 115 to request an electronic token for the purchase transaction.

At 604, electronic device 115 may transmit transaction information for the pending purchase transaction via network 140 to token server 130. After receiving the transaction information, token server 130 may query database 135 and receive account information 606 associated with user 105 and/or electronic device 115 (transmission 606). Using the account information and the transaction information, token server 130 generates an electronic token for the purchase transaction, and transmits the token in transmission 608 to electronic device 115. Token server 130 may also transfer token parameters to database 135 (step 610), including expiration parameters.

In step 612, electronic device 115 provides the generated electronic token via network 140 to third party server 150, such as a server associated with the seller merchant. Third party server 150 may present the electronic token to transaction server 160. In some embodiments, third party server 150 may present the electronic token directly to token server 130. In other embodiments, token server 130 and transaction server 160 may be the same computer system.

Following the example in FIG. 6, in step 616 transaction server may submit a transaction request to token server 130, having the electronic token received from third party server 130 and information about the transaction. Token server 130 may process the received request, electronic token, and token parameters including expiration parameters again accessed from database 135 (step 610), and determine whether the electronic token is valid, not expired, and properly associated with the transaction request. In step 618, token server 130 may communicate an authorization approval or denial to transaction server 160. Thereafter, transaction server 160 proceeds to process the authorized payment or communicate the denial to third party server 150 (not shown in figure). In some embodiments, token server 130 or transaction server 160 may also communicate information about the approval or denial to electronic device 115 (not shown in figure).

Figure 7:
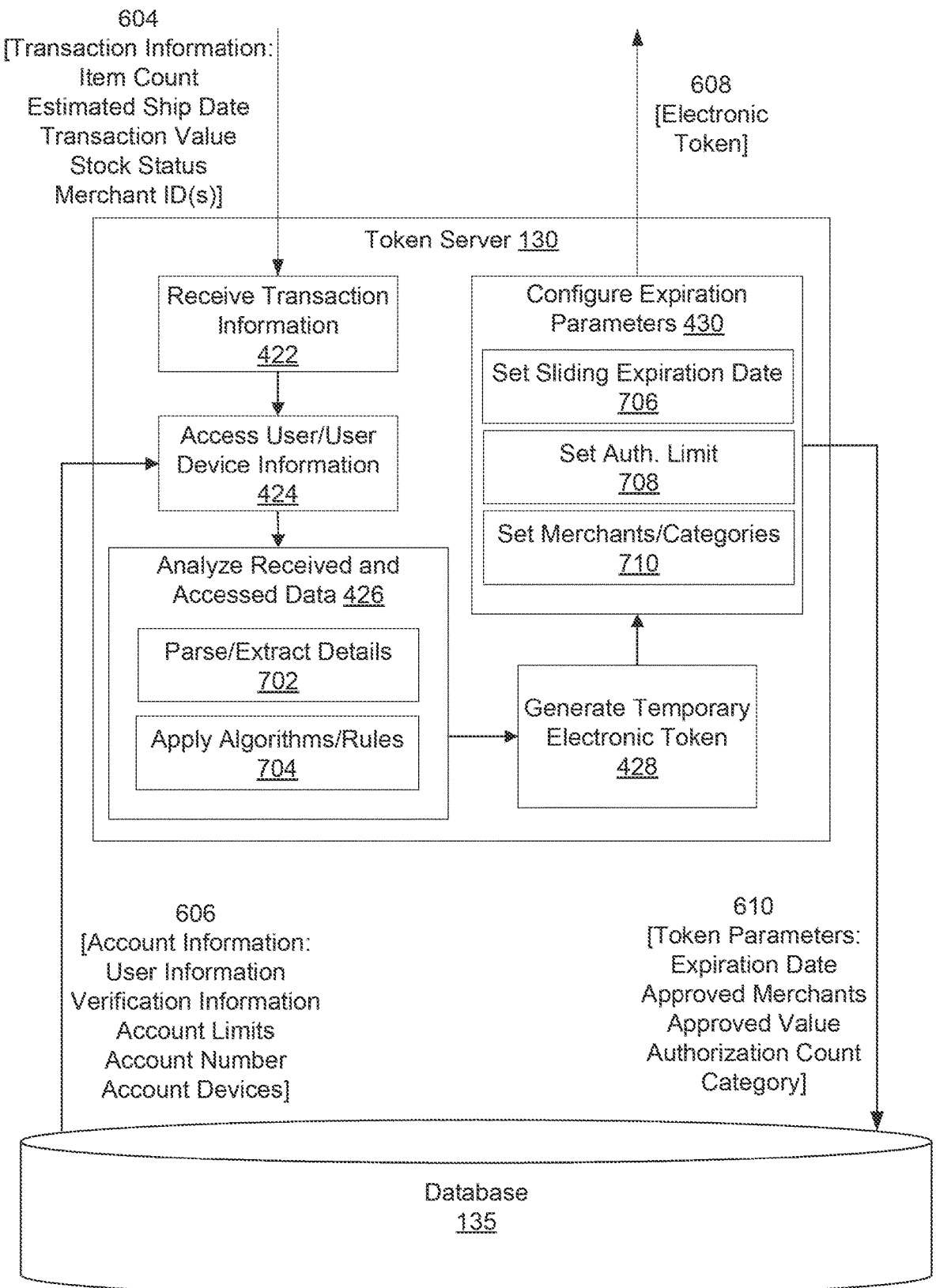
FIG. 7 is a diagram of an exemplary data flow of a detailed portion of the process depicted in FIG. 6, consistent with disclosed embodiments.

FIG. 7 is a diagram of an exemplary data flow of a detailed portion of the process depicted in FIG. 6. In particular, FIG. 7 depicts a portion of process 400 from FIG. 4, in which token server 130 generates a new electronic token. As shown, in step 422 token server 130 may receive transaction information that was transmitted from electronic device 115 in step 604. Token server 130 then accesses user and/or user device information (step 424) and receives the information from database 135 (step 606). In step 426, token server may analyze received and accessed data including the received transaction information and accessed user/user device information, by performing steps such as parsing and extracting details (step 702) and applying algorithms or rules to the information (step 704). In step 428, token server 130 generates a temporary electronic token associated with the analyzed information, and in step 430 token server configures one or more expiration parameters for the electronic token. As previously discussed, configuring the expiration parameters may include, for example, setting a sliding expiration date (step 706), setting an authorization limit (step 708), and setting associated merchant IDs or purchase categories (step 710). Token server 130 then stores the configured expiration parameters and other token parameters in database 135 (step 610) and provides the generated electronic token to electronic device 115 (step 608).

Figure 8:
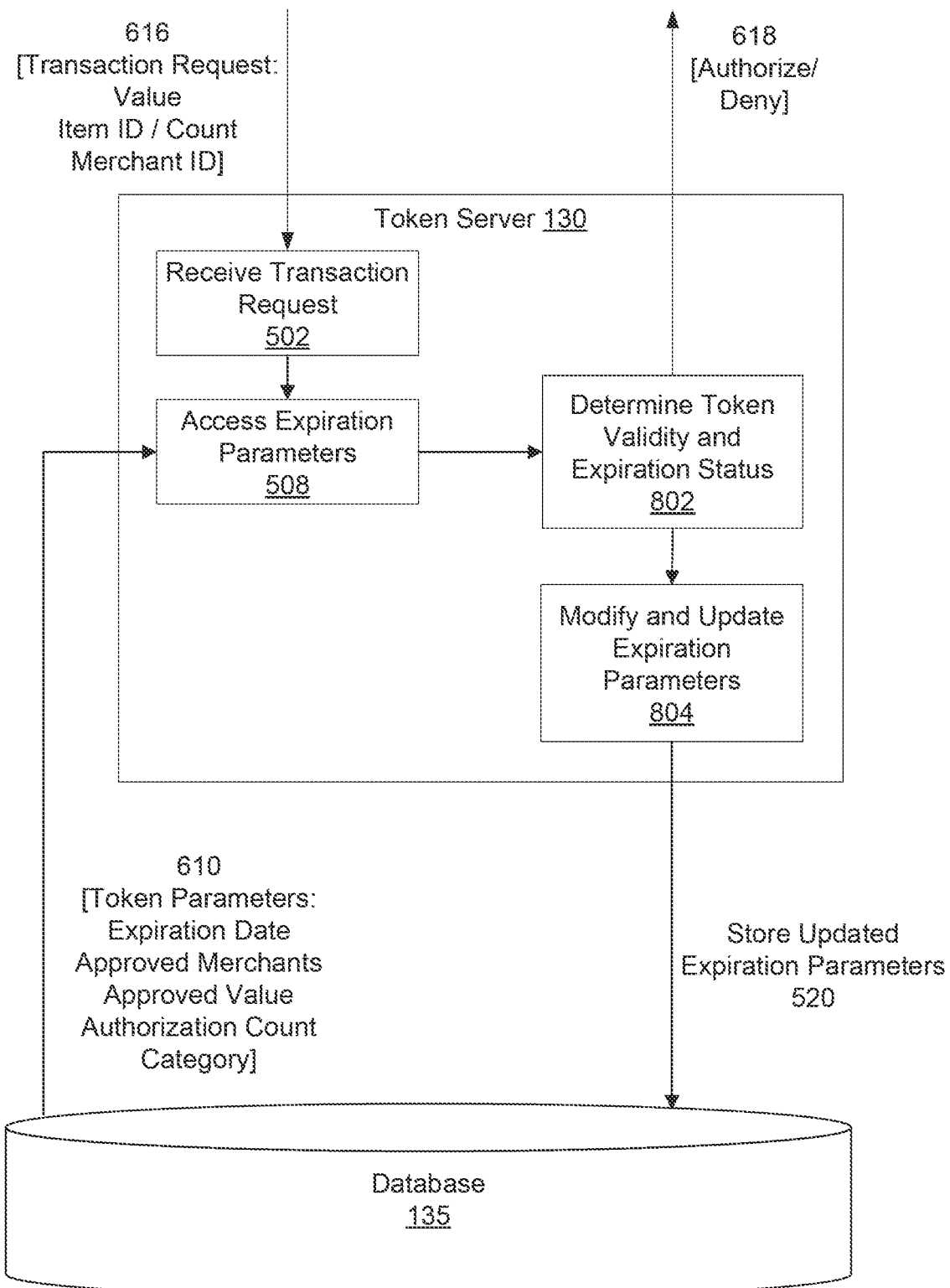
FIG. 8 is a diagram of an exemplary data flow of another detailed portion of the process depicted in FIG. 6, consistent with disclosed embodiments.

FIG. 8 is a diagram of an exemplary data flow of another detailed portion of the process depicted in FIG. 6. In particular, FIG. 8 depicts a portion of FIG. 6 in which token server 130 manages and processes incoming transaction requests for an electronic token, consistent with FIG. 5. As shown, token server 130 receives a first or subsequent transaction request in step 502, in response to transaction server 160 or third party server 150 transmitting the request (step 616). In step 508 token server 130 accesses expiration parameters associated with the electronic token, and receives the token parameters including the expiration parameters from database 135 (step 610). Token server 130 then determines the validity of the electronic token and an expiration status of the electronic token based on the received transaction request and accessed information (step 802). Based on the determination, token server 130 transmits an authorization or denial to transaction server 160 and/or third party server 150 (step 618). If needed, token server 130 also modifies and updates the electronic token expiration parameters (step 804), and stores the updated expiration parameters in database 135 (step 520).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A server system for generating and using electronic tokens, comprising:
   one or more storage devices storing instructions; and
   one or more processors configured to execute the instructions for:
   receiving, from a user device, transaction information corresponding to a transaction;
   generating an electronic token based on:
     at least one of a user or the user device;
     the transaction information; and
     a first expiration parameter comprising the transaction information and account information corresponding to the user, wherein the server system dynamically updates the first expiration parameter in response to changes to the transaction information and the account information;
   providing the electronic token to the user device;
   receiving a transaction request for the transaction, wherein the transaction request includes the electronic token;
   verifying that the transaction request is valid by determining whether the first expiration parameter corresponding to the electronic token has been exceeded; and
   in response to determining that the first expiration parameter has not been exceeded, authorizing the transaction.

2. The server system of claim 1, wherein the one or more processors are further configured to execute the instructions for:
   receiving the transaction information in response to the user device initiating a handshake with the server system.

3. The server system of claim 1, wherein the transaction information further includes:
   one or more of:
   a description of an item;
   a provider associated with the item or service; and
   item availability information.

4. The server system of claim 1, wherein the one or more processors are further configured to execute the instructions for:
   identifying user information and user device information associated with the user and the user device respectively by querying a database, wherein the user information and the user device information includes sensitive data unique to the user and the user device.

5. The server system of claim 4, wherein the sensitive data includes one or more of: identification information, verification information, or biometric information.

6. The server system of claim 5, wherein the one or more processors are further configured to execute the instructions for:
   analyzing the transaction information, the user information, and the user device information, to compile data in preparation for generating the electronic token.

7. The server system of claim 6, wherein the one or more processors are further configured to execute the instructions for:
   parsing the data to determine whether the transaction exceeds any limits.

8. A computer-implemented method for generating and using electronic tokens, comprising:
   receiving, from a user device, transaction information corresponding to a transaction;
   generating an electronic token based on:
     at least one of a user or the user device;
     the transaction information; and
     a first expiration parameter comprising the transaction information and account information corresponding to the user, wherein the first expiration parameter is dynamically updated in response to changes to the transaction information and the account information;
   providing the electronic token to the user device;
   receiving a transaction request for the transaction, wherein the transaction request includes the electronic token;
   verifying that the transaction request is valid by determining whether the first expiration parameter corresponding to the electronic token has been exceeded; and
   in response to determining that the first expiration parameter has not been exceeded, authorizing the transaction.

9. The computer-implemented method of claim 8, further comprising:
   receiving the transaction information in response to the user device initiating a handshake with a server system.

10. The computer-implemented method of claim 8, wherein the transaction information further includes:
    one or more of:
    a description of an item;

a provider associated with the item or service; and item availability information.

11. The computer-implemented method of claim 8, further comprises:

identifying user information and user device information associated with the user and the user device respectively by querying a database, wherein the user information and the user device information includes sensitive data unique to the user and the user device.

12. The computer-implemented method of claim 11, wherein the sensitive data includes one or more of: identification information, verification information, or biometric information.

13. The computer-implemented method of claim 12, further comprising:

analyzing the transaction information, the user information, and the user device information, to compile data in preparation for generating the electronic token.

14. The computer-implemented method of claim 13, further comprising:

parsing the data to determine whether the transaction exceeds any limits.

15. A non-transitory computer readable medium storing instructions for generating and using electronic tokens, that when executed by one or more processors, implement a method comprising:

receiving, from a user device, transaction information corresponding to a transaction;

generating an electronic token based on:

at least one of a user or the user device;

the transaction information; and a first expiration parameter comprising the transaction information and account information corresponding to the user, wherein the first expiration parameter is dynamically updated in response to changes to the transaction information and the account information;

providing the electronic token to the user device;

receiving a transaction request for the transaction, wherein the transaction request includes the electronic token;

verifying that the transaction request is valid by determining whether the first expiration parameter corresponding to the electronic token has been exceeded; and in response to determining that the first expiration parameter has not been exceeded, authorizing the transaction.

16. The non-transitory computer readable medium of claim 15, wherein the method further comprises:

receiving the transaction information in response to the user device initiating a handshake with a server system.

17. The non-transitory computer readable medium of claim 15, wherein the transaction information further includes:

one or more of:

a description of an item;

a provider associated with the item or service; and item availability information.

18. The non-transitory computer readable medium of claim 15, wherein the method further comprises:

identifying user information and user device information associated with the user and the user device respectively by querying a database, wherein the user information and the user device information includes sensitive data unique to the user and the user device.

19. The non-transitory computer readable medium of claim 18, wherein the sensitive data includes one or more of: identification information, verification information, or biometric information.

20. The non-transitory computer readable medium of claim 19, wherein the method further comprises:

analyzing the transaction information, the user information, and the user device information, to compile data in preparation for generating the electronic token.

* * * * *